Oct. 23, 1934.        O. K. KJOLSETH        1,978,207
WELDED RAILWAY TRUCK
Filed May 24, 1933        2 Sheets-Sheet 1
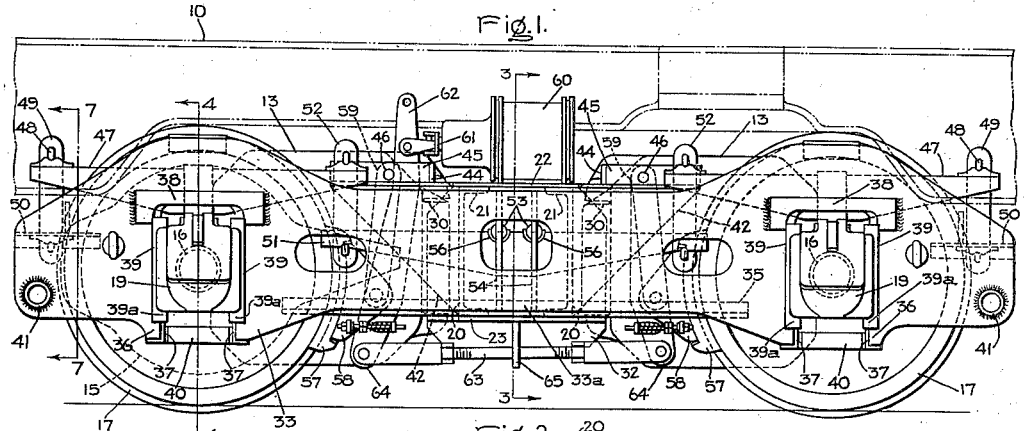
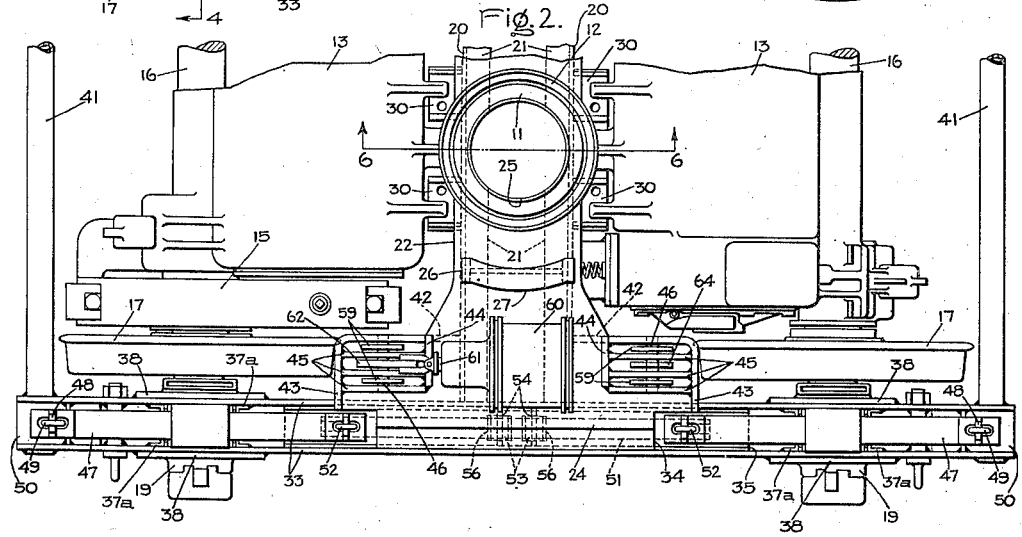
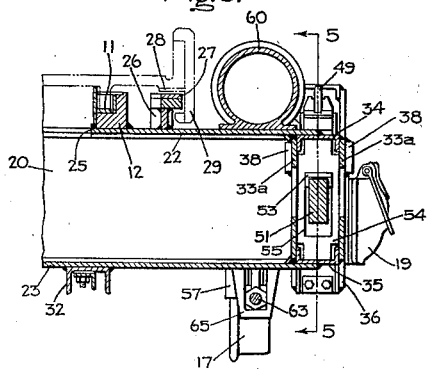
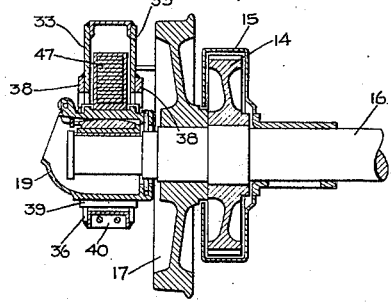
Inventor:
Ole K. Kjolseth,
by Harry E. Dunham
His Attorney.

Oct. 23, 1934.  O. K. KJOLSETH  1,978,207
WELDED RAILWAY TRUCK
Filed May 24, 1933  2 Sheets-Sheet 2
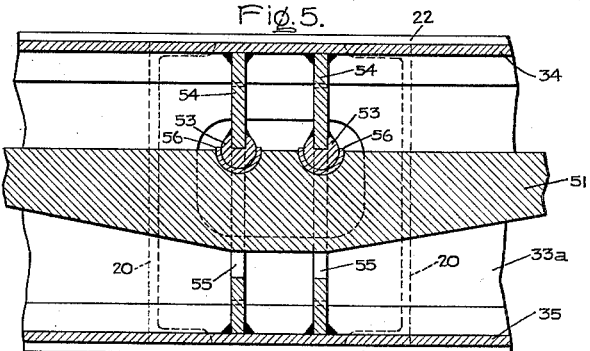
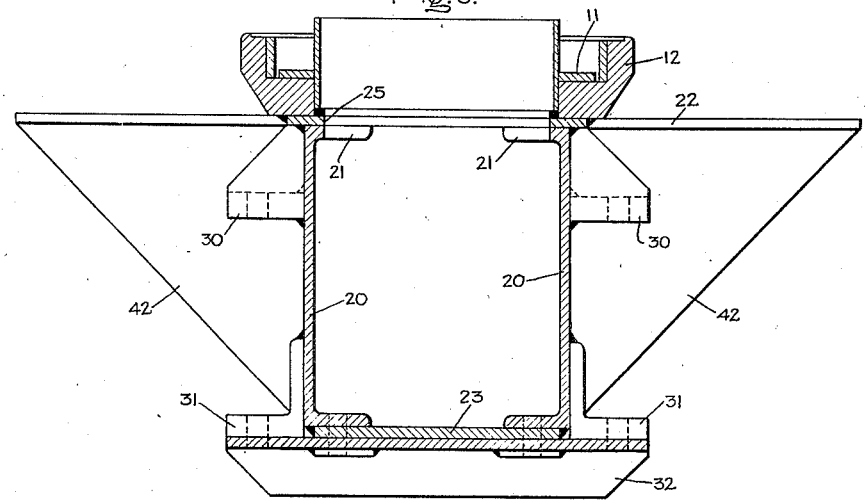
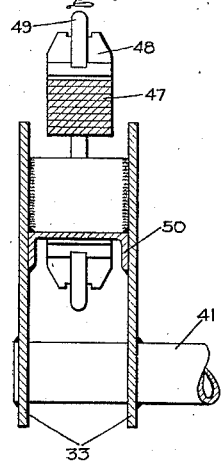
Inventor:
Ole K. Kjolseth,
Harry E. Dunham
by
His Attorney.

Patented Oct. 23, 1934

1,978,207

UNITED STATES PATENT OFFICE 1,978,207

WELDED RAILWAY TRUCK

Ole K. Kjolseth, Erie, Pa., assignor to General Electric Company, a corporation of New York Application May 24, 1933, Serial No. 672,597

5 Claims. (Cl. 105—202)

My invention relates to welded trucks for vehicles.

An object of my invention is to provide a fabricated locomotive or car truck of simplified and improved mechanical construction.

Further objects and advantages of my invention will become apparent as the following description proceeds and the features of novelty which characterize my invention will be pointed out with particularity in the claims annexed to and forming a part of this specification.

For a better understanding of my invention reference may be had to the accompanying drawings in which Fig. 1 is a side elevation of an improved railway truck embodying my invention; Fig. 2 is a plan view of part of the truck shown in Fig. 1; Fig. 3 is a cross-sectional view on the line 3—3 of Fig. 1 more clearly showing the side frame construction and the arrangement of the side bearings and center plate on the bolster; Fig. 4 is a cross-sectional view on the line 4—4 of Fig. 1 showing the detail arrangement of the springs and side frame with respect to the journal boxes; Fig. 5 is a cross-sectional view on the line 5—5 of Fig. 3 showing the equalizer fulcrum arrangement of the side frame; Fig. 6 is a cross-sectional view on the line 6—6 of Fig. 2 showing the bolster and center plate construction; and Fig. 7 is a cross-sectional view on the line 7—7 of Fig. 1 showing the details of the end construction of the side frame.

Referring to the drawings, in Figs. 1 to 4, I have shown a truck supporting a locomotive or car underframe 10 on cooperating underframe and truck center plates 11 and 12, respectively. The truck is provided with driving motors 13 connected by gears 14 in housings 15 to axles 16 and wheels 17. The truck includes a unitary structure built of structural steel members welded together and which comprises a bolster and side frames with reinforcing members welded thereto. This unitary structure is spring borne upon journal boxes 19 in which the axles 16 are mounted.

In accordance with my invention the bolster is built up of two channels 20 having their flanges 21 extending toward each other, and integrally connected by welding thereto top and bottom plates 22 and 23, respectively, the ends of which plates extend slightly beyond the ends of the channels as shown in Fig. 3. Plates 22 and 23 are enlarged at the ends and have arms 24 extending to the sides thereof for the purpose of reinforcing the truck side frames. A circular opening 25 is provided in the middle of the upper plate 22 and about this opening is securely welded the center plate 12 of the bolster. Truck side supports 26 are welded to the plates 22 on either side of the center bearings 12 in position such that truck side bearings 27 welded thereto will engage the underframe side bearings 28 as shown in Fig. 3 to provide lateral stability, a bracket 29 being provided to limit the vertical movement between the truck and the car frame. As may be seen in Figs. 2 and 6, top motor supporting brackets 30 are welded on either side of the channels 20 below the top of the bolster. Directly below the top motor supports 30 are located bottom motor supports 31 welded to the channels 20 and reinforced by channel pieces 32 welded to the lower side of the bottom plate 23 and to the motor supports 31. The motors 13 have lugs engaging these supports at one side and are journaled on the axles 17 at the other side.

The side frames of the truck are each constructed of two plates 33 having reduced central portions 33a and which are spaced apart and braced by channels 34 and 35 extending along the central portions at the top and bottom, respectively, and welded thereto. The side frames are welded to the ends of the bolster, the portions 33a fitting between the extending ends of the plates 22 and 23. Downwardly opening pedestal jaws 36 are provided near the ends of the side frames engaging the journal boxes 19. Corresponding sides of the jaws in each pair of side frame plates are joined by channels 37 having flanges 37a welded to the inner sides thereof, and the frame plates are reinforced by straps 38 welded to the plates at the upper ends of the recesses. Guides for journal boxes 19 are formed by channels 39 placed over the channels 37 and having flanges 39a welded to the outer sides of the frame plates. The pedestal recesses or jaws are closed at their lower open ends by tie bars 40 which are bolted or otherwise removably secured to the channels 37 between the plates of the side frames and prevent spreading of the jaws. Stay rods 41 welded in openings in the ends of the frame plates 33 extend between the side frames and are provided to make the truck structure more rigid. Brake hanger brackets 42 are welded to the bolster and have angle pieces 43 welded thereto and to the side frames. Brake hanger supports comprising short bars 44 and a plurality of parallel bars 45 are welded to the brake angle pieces 43 and to the top plate 22 of the bolster. The brake hanger supports are drilled to receive hanger pins 46.

The truck frame is supported on leaf springs 47 bearing at their centers on the journal boxes 19. The outer ends of the springs 47 engage pivots 48 of spring hangers 49 which pivotally engage channels 50 welded between the plates of the side frames. The inner ends of the springs 47 are connected to an equalizing bar 51 by hangers 52. The equalizing bar 51 rests at its center on a double fulcrum comprising two cylindrical pivots 53. The construction of the equalizing bar fulcrum is best seen in Fig. 5, where I have shown two plates 54 welded between the side frame plates 33 and provided with openings 55 through which passes the equalizer bar 51. The cylindrical pivots 53 are welded to the plates 54 at the tops of the openings 55 therein, and the equalizer bars 51 are provided with semi-circular bearings 56 which engage the pivots 53.

Brake shoes 57 secured to brake heads 58 are arranged to be moved into and out of engagement with the wheels 17 by a brake rigging including brake hangers 59 suspended from the brake hanger supports on the pins 46. Compressed air brake operating cylinders 60 are welded to the bolster in line with the brake hanger support. Braking force is applied from the cylinders 60 through the piston rods 61 to brake levers 62 pivoted to the brakes which engage the wheels on one axle and is transmitted through an adjustable equalizing bar 63 and an operating lever 64 to the brakes which engage the wheels at the other end of the truck. Movement of the piston rods 61 to the left, as shown in Fig. 1, applies the brake shoes to both wheels as is evident from the arrangement of the brake mechanism. An emergency brake rod support 65 is welded to the bolster in order to prevent possible damage due to the falling of the brake equalizing bars 63 to the road bed.

In view of the foregoing it will be apparent that I have provided a simple fabricated truck construction in which the joints are securely welded together and all parts securely reinforced.

While I have disclosed a particular embodiment of my invention in connection with a truck for an electric rail vehicle, modifications will occur to those skilled in the art. I do not, therefore, desire my invention to be limited to the embodiment shown and described, and I intend in the appended claims to cover all modifications thereof which do not depart from the spirit and scope of my invention.

What I claim as new and desire to secure by Letters Patent of the United States, is:

1. A truck including a frame comprising a bolster and side frames welded thereto, said bolster comprising a plurality of channels spaced apart and joined at the top and bottom by plates welded thereto, said side frames comprising a plurality of parallel plates having pedestal openings therein and extending the full length of said truck, pedestal guides arranged in the openings in said plates, journal boxes mounted in said pedestal guides, said parallel plates being spaced apart and connected together in pairs by a plurality of bracing plates welded thereto, and a side spring suspension system arranged to resiliently support said frame on said journal boxes.

2. A truck including a plurality of wheels and axles, journal boxes on said axles, a unitary frame structure comprising a bolster and side frames, said bolster comprising a plurality of channels spaced apart and joined at the top and bottom by plates welded thereto, said side frames including a plurality of parallel plates arranged in pairs extending the full length of said truck and spaced apart by channels welded thereto, said parallel plates having vertically extending openings forming pedestals, reenforcing plates welded to said parallel plates above said openings, journal box guides comprising vertically extending channels welded to the sides of said pedestals, and means including springs arranged between said parallel plates for resiliently supporting said unitary frame on said journal boxes.

3. A truck including a plurality of wheels and axles, journal boxes on said axles, a unitary truck frame structure comprising a bolster and side frames, said bolster comprising a plurality of channels spaced apart and joined at the top and bottom by plates welded thereto, said side frames including pairs of parallel plates extending the full length of said truck and joined by channels welded thereto, said parallel plates having pedestal openings, channels extending between each of said pairs of plates and welded to the inner sides of the plates of each of said pairs of plates adjacent said pedestal openings, and means including channels arranged over said last named channels and welded to the outer sides of the plates of each of said pairs of plates adjacent said pedestal openings for engaging said journal boxes, and means including springs arranged for resiliently supporting said unitary frame on said journal boxes.

4. A truck including a plurality of wheels and axles, journaled boxes on said axles, a unitary frame structure comprising a bolster and side frames, said bolster comprising a plurality of channels spaced apart and joined at the top and bottom by plates welded thereto, said side frames including a plurality of parallel plates extending the full length of said truck and joined in pairs at the top and bottom at their central sections, and adjacent the ends thereof by channels welded thereto, means including openings in said parallel plates for slidably engaging said journal boxes, a spring suspension system housed within said side frames and including leaf springs seated on said journal boxes, an equalizer bar connecting said springs, equalizer fulcrums welded to said side frames, fulcrum bearings arranged on said equalizer bar, and spring hangers connecting said springs to said equalizer bar and to said side frames.

5. A truck including a plurality of wheels and axles, journal boxes on said axles, a unitary frame structure comprising a bolster and side frames, said bolster comprising a plurality of longitudinally extending channels spaced apart and integrally joined at the top and bottom by plates projecting beyond the ends of said channels, said side frames including a plurality of parallel plates extending the full length of said truck and joined at the top and bottom of their mid-portions and adjacent the ends thereof by channels welded thereto and to the projecting ends of said bolster channels, said parallel plates having openings near each end forming pedestals and engaging said journal boxes, a brake rigging including brake shoes for engaging said wheels, means including a cylinder welded to said bolster for operating said brake rigging, means including a bracket formed of a plurality of plates welded together and welded to said bolster for supporting said brake rigging, and means for resiliently supporting said unitary frame on said journal boxes.

OLE K. KJOLSETH.